Figure 1:
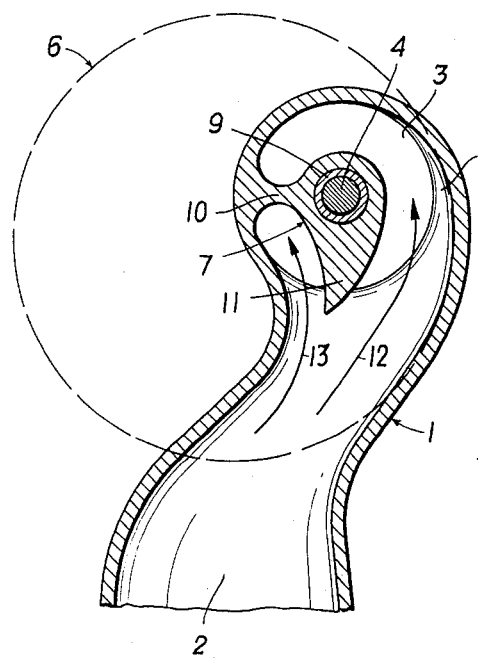

United States Patent [19]
Kirchweger

[11] 3,868,940
[45] Mar. 4, 1975

[54] INLET PORT FOR INTERNAL COMBUSTION ENGINES, IN PARTICULAR FOR DIESEL ENGINES

[76] Inventor: Karl Kirchweger, 87, Krottenhofstrasse, Graz, Austria A 8010

[22] Filed: Apr. 23, 1973

[21] Appl. No.: 353,575

[30] Foreign Application Priority Data
Sept. 15, 1972 Austria .............................. 7961/72

[52] U.S. Cl. ..... 123/188 M, 123/188 VA, 123/30 C
[51] Int. Cl. ....................... F02b 31/02, F02m 35/10
[58] Field of Search.. 123/188 M, 188 VA, 188 AF, 123/188 GC, 193 CH

[56] References Cited
UNITED STATES PATENTS

| | | | |
|---|---|---|---|
| 2,054,621 | 9/1936 | Frelin | 123/188 VA |
| 2,921,571 | 1/1960 | Vogel et al. | 123/188 M |
| 3,008,458 | 11/1961 | Eisele et al. | 123/188 M X |
| 3,273,551 | 9/1966 | Julien et al. | 123/188 M |

FOREIGN PATENTS OR APPLICATIONS

| | | | |
|---|---|---|---|
| 1,044,513 | 11/1958 | Germany | 123/188 M |
| 2,012,436 | 11/1970 | Germany | 123/188 M |
| 269,922 | 5/1928 | Italy | 123/188 M |
| 310,679 | 8/1933 | Italy | 123/188 VA |
| 539,948 | 2/1956 | Italy | 123/30.2 |
| 888,036 | 8/1953 | Germany | 123/188 VA |
| 1,032,972 | 6/1958 | Germany | 123/30.2 |
| 1,048,438 | 1/1959 | Germany | 123/188 VA |

*Primary Examiner*—Charles J. Myhre
*Assistant Examiner*—W. Rutledge, Jr.
*Attorney, Agent, or Firm*—Watson, Cole, Grindle & Watson

[57] ABSTRACT

An inlet port for internal combustion engines for the production of a rotational flow in the cylinder, comprising a spiral-shaped annular chamber arranged above the intake valve, wound around the valve stem and sloping off towards the valve seat, a rib protruding into the spiral-shaped annular chamber and subdividing the same to from two part currents of the combustion air admitted through the feed duct of the inlet port, said rib consisting of a portion leading from the port wall to the valve guide bearing and of an adjacent portion extending from the valve guide bearing in the direction of the feed duct and essentially of a vane-like shape.

4 Claims, 3 Drawing Figures

PATENTED MAR 4 1975 3,868,940

3,868,940

INLET PORT FOR INTERNAL COMBUSTION ENGINES, IN PARTICULAR FOR DIESEL ENGINES

The patent application Ser. No. 271,234, filed July 13th, 1972, by Hans List et al and now abandoned, relates to an inlet port for internal combustion engines, particularly diesel engines, for the production of a rotational flow in the cylinder, wherein in the vicinity of the valve the feed duct transforms into an annular chamber arranged around the valve stem above the intake valve. The scope of the present invention includes a design of this inlet port comprising a rib protruding into the annular chamber and subdividing the annular chamber, said rib being located in a peripheral area of the annular chamber between the inner partition of the inlet port at the point of transition to the annular chamber and a point which is offset by 90° in opposition to the sense of the intended rotational flow in the cylinder, and preferably extending in an axial direction as far as the proximity of the valve seat.

It is the purpose of this design of the inlet port according to the parent patent to divide the combustion air admitted through the inlet port into at least two part currents flowing in the cylinder in opposite directions of rotation, so that the part currents collide inside the cylinder, thereby producing a high degree of turbulence. At the same time, the weaker of the two part currents is carried along by the stronger one in the sense of the desired direction of the rotational flow in the cylinder. The high degree of turbulence thereby produced contributes towards a speedy and uniform combustion of the fuel injected and consequently, to a reduction of the percentage of noxious components in the exhaust gas.

It is the object of the present invention to further improve upon the design of the subject matter of the parent patent in such a manner as to substantially influence the degree of turbulence and the intensity of the resulting rotational flow in the cylinder.

For that purpose, the inlet port according to the invention is essentially shaped like a spiral duct and the rib consists of a portion leading from the port wall to the valve guide bearing and of an adjacent portion extending from the valve guide bearing in the direction of the feed duct and essentially of a vane-like shape. Experience goes to show that this design of the rib subdividing the annular chamber in cooperation with the spiral shape of the inlet port produces turbulence of a high degree with a very low resistance to the flow in the inlet port and an adequate rotational flow of the combustion air. It is thus possible to further improve the combustion process with advantageous results for the composition of the exhaust gas.

According to a preferred embodiment of the invention the vane-like rib portion can be so arranged on the valve guide bearing as to be rotatable about the valve axis. Thus the combustion air can be divided into two part currents in varying proportions as required so that the turbulence and rotational behaviour of the combustion air in the cylinder can be controlled as desired.

In connection with the last-mentioned embodiment of the invention the vane-like rib portion is conveniently designed as a sheet metal blade curved in the sense of the inlet port spiral and attached to a tubular sleeve rotatably supported by the valve guide bearing, e.g., by welding, approximately in tangential relation to same. The principal advantage of this design results in reduced production costs.

Figure 2:
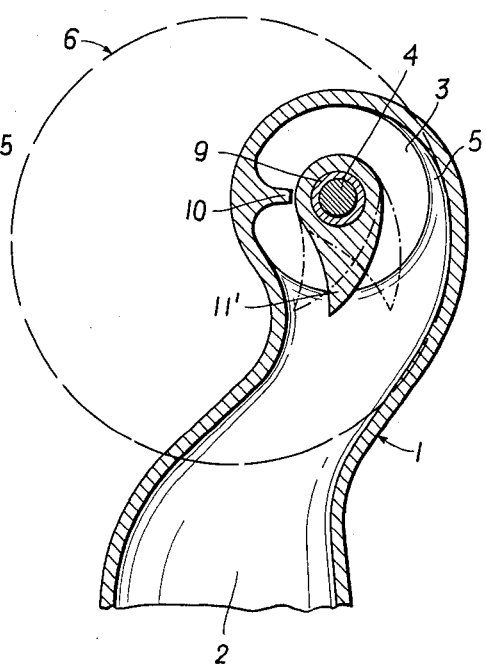
Figure 3:
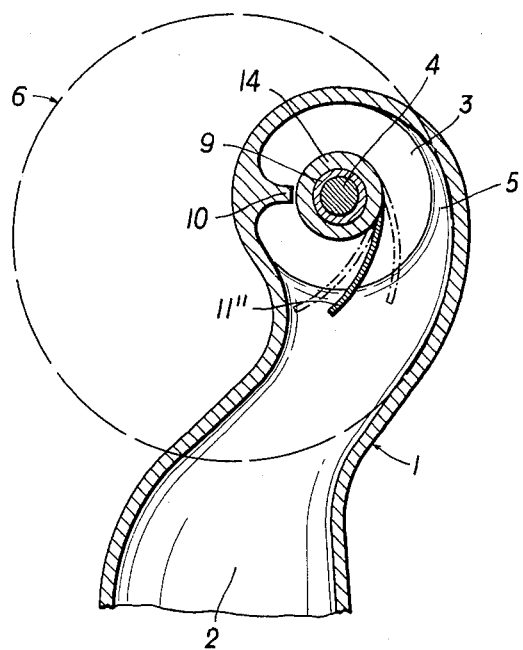

Further details of the invention will become apparant from the following description of several embodiments of the invention with reference to the schematic drawing wherein FIG. 1 shows a horizontal cross-sectional view of a first embodiment of the invention, and FIGS. 2 and 3 identical views of other types of inlet ports according to the invention.

In all of the embodiments of the invention shown in the accompanying drawings, the inlet port 1 has the shape and follows the pattern of a conventional spiral duct, wherein in the area above the intake valve 3 the feed duct 2 is joined by an annular chamber sloping off towards the valve and wound around the valve stem 4. The winding direction of the spiral determines the sense of rotation of the combustion air in the cylinder of which only the external contours 6 are indicated by dotted lines. In the present instance the sense of rotation of the cylinder charge is counter-clockwise.

The annular chamber 5 is subdivided by means of a rib 7 consisting of a portion 10 protruding from the inner partition of the inlet port 1 towards the valve guide bearing 9 and an adjacent vane-shaped portion 11 extending from the valve guide bearing 9 towards the feed duct 2. The rib 7 preferably extends towards the valve axis as far as the immediate vicinity of the valve seat.

By means of the rib 7 the combustion air admitted through the feed duct 2 is subdivided into two part currents 12, 13, the stronger part current 12 being directed outside the vane-shaped portion 11 of the rib 7 and entering directly into the spiral-shaped annular chamber 5. This main air current 12 produces an counter-clockwise rotational flow following its passage into the cylinder 6.

The weaker part current 13 flows inside the vane-shaped rib portion 11 and is directed by means of the rib portion 10 towards the valve clearance in such a manner as to be imparted with an essentially clockwise rotation of flow about the cylinder axis when entering the cylinder 6. Consequently, the two part currents 12 and 13 collide inside the cylinder 6, producing vehement turbulence. In cooperation with the resulting flow in the cylinder this turbulence improves the combustion process by intensifying the mixture of combustion air with the injected fuel and by terminating the combustion at a faster rate.

According to the embodiment shown in FIG. 1 the two portions 10 and 11 of the rib 7 are integrally cast with the inlet port wall 8, whereas according to the embodiments illustrated in FIGS. 2 and 3 the vane-shaped rib portion 11' or 11'' is a separate element mounted on the valve guide bearing 9 in such a manner as to be rotatable about the axis of the intake valve 3. By appropriately tilting this rib portion 11' or 11'' the quantitative relationship between the two part currents 12 and 13 can be varied in such a manner as to produce the required degree of turbulence of the resulting rotational flow of the combustion air.

In the embodiment of the invention illustrated in FIG. 2 the rib portion 11' is a solid section whose cross section is similar in shape to an airfoil. The sharp edge of this airfoil faces the feed duct 2. The extreme end positions of the vane-shaped rib portion 11' are indicated by dotted lines.

In the embodiment of the invention shown in FIG. 3 the vane-shaped rib portion 11″ is designed as a sheet metal blade curved in the sense of the inlet port spiral and welded to a tubular sleeve 14 rotatably mounted on the valve guide bearing 9 in tangential relation to same.

I claim:

1. An internal combustion engine comprising:
   at least one cylinder;
   an inlet duct leading to the cylinder and having a circular aperture open to the cylinder;
   an intake valve with a valve stem located within the inlet duct, said intake valve being eccentrically arranged in relation to the cylinder;
   a valve guide bearing encompassing the valve stem;
   said inlet duct including a feed duct for the admission of air for combustion and an adjoining annular chamber wound in a spiral-shape around the valve stem sloping off towards the circular aperture of said inlet duct;
   a partition in said annular chamber extending from a section of the inner boundary wall of the inlet duct and lying in a plane containing the axis of the valve stem and dividing said annular chamber into two compartments; and
   an airfoil-shaped member extending from said valve guide bearing in an upstream direction of said feed duct and dividing the feed duct into two separate branches, each of said branches being connected with one of the compartments of said annular chamber and said airfoil-shaped member being curved in the direction of the winding of the spiral-shaped portion of said inlet duct.

2. An internal combustion engine as claimed in claim 1, wherein said partition and said airfoil-shaped member are integrally casted with the wall of said inlet duct.

3. An internal combustion engine as claimed in claim 1, wherein said airfoil-shaped member is supported by said valve guide bearing and rotatable in relation to the axis of said valve.

4. An internal combustion engine as claimed in claim 3, wherein the airfoil-shaped member is formed by a sheet metal blade attached to a tubular sleeve rotatably mounted on said valve guide bearing, in an approximately tangential relation to said bearing.

* * * * *